(12) United States Patent
Genesin et al.

(10) Patent No.: US 9,120,381 B2
(45) Date of Patent: Sep. 1, 2015

(54) INTERFACE SYSTEM FOR A ROAD VEHICLE PROVIDED WITH A LIQUID-CRYSTAL DISPLAY AND A CONTROL DEVICE FOR CONTROLLING THE INFORMATION APPEARING ON THE DISPLAY

(75) Inventors: Pietro Genesin, Maranello (IT); Adriana Di Pede, Maranello (IT); Luca Canovi, Reggio Emilia (IT); Stefano Marzani, Scandiano (IT); Roberto Montanari, Scandiano (IT); Marco Ferretti, Massenzatico (IT); Andrea Pavesi, Guastalla (IT)

(73) Assignee: FERRARI S.p.A., Modena (IT)

( * ) Notice: Subject to any disclaimer, the term of this patent is extended or adjusted under 35 U.S.C. 154(b) by 1212 days.

(21) Appl. No.: 12/733,925

(22) PCT Filed: Sep. 25, 2008

(86) PCT No.: PCT/IB2008/002499
§ 371 (c)(1),
(2), (4) Date: Oct. 13, 2010

(87) PCT Pub. No.: WO2009/040643
PCT Pub. Date: Apr. 2, 2009

(65) Prior Publication Data
US 2011/0032186 A1   Feb. 10, 2011

(30) Foreign Application Priority Data
Sep. 26, 2007  (IT) .............................. BO2007A0656

(51) Int. Cl.
*G06F 3/041* (2006.01)
*G09G 5/00* (2006.01)
(Continued)

(52) U.S. Cl.
CPC ................ *B60K 37/06* (2013.01); *G06F 3/016* (2013.01); *G06F 3/0236* (2013.01);
(Continued)

(58) Field of Classification Search
USPC ................... 345/156–184; 178/18.01–20.04; 173/18.01–20.04
See application file for complete search history.

(56) References Cited

U.S. PATENT DOCUMENTS 6,011,542 A   1/2000   Durrani et al.
6,411,934 B1  6/2002   Moller et al.
(Continued)

FOREIGN PATENT DOCUMENTS

DE   10203559   8/2002
DE   10341471   8/2004
(Continued)

OTHER PUBLICATIONS

International Search Report and Written Opinion mailed May 4, 2009 in PCT Appln. No. PCT/IB2008/002499.

*Primary Examiner* — Ryan A Lubit
(74) *Attorney, Agent, or Firm* — Davidson Berquist Jackson & Gowdey, LLP

(57) ABSTRACT

An infotelematic system for a road vehicle, having: at least one liquid-crystal display; and a control device of the joystick type provided with a bar, which has a visible top portion that is shaped so as to be guided by a user's hand, and a hidden bottom portion, which is hinged at the bottom by means of a ball joint so as to be able to turn freely about a central hinge point; the control device is moreover provided with at least one haptic actuator, which is coupled to the bottom portion of the bar for varying the effort necessary for displacement of the bar itself.

7 Claims, 13 Drawing Sheets

(51) Int. Cl.
*G09G 5/08* (2006.01)
*G06F 3/033* (2013.01)
*B60K 37/06* (2006.01)
*G06F 3/01* (2006.01)
*G06F 3/023* (2006.01)
*G06F 3/0338* (2013.01)
*G06F 3/0354* (2013.01)
*G06F 3/0489* (2013.01)
*G05G 9/047* (2006.01)

(52) U.S. Cl.
CPC ........... *G06F 3/0338* (2013.01); *G06F 3/0354* (2013.01); *G06F 3/03548* (2013.01); *G06F 3/0489* (2013.01); *B60K 2350/1024* (2013.01); *B60K 2350/1048* (2013.01); *G05G 2009/04766* (2013.01); *G06F 2203/015* (2013.01)

(56) References Cited

U.S. PATENT DOCUMENTS

| | | | |
|---|---|---|---|
| 6,529,125 | B1 | 3/2003 | Butler et al. |
| 6,694,236 | B2 * | 2/2004 | Onodera ................... 701/36 |
| 7,061,466 | B1 | 6/2006 | Moore et al. |
| 2004/0215564 | A1 * | 10/2004 | Lawlor et al. ................ 705/40 |
| 2006/0066587 | A1 * | 3/2006 | Morohoshi et al. ........... 345/173 |
| 2006/0071917 | A1 * | 4/2006 | Gomez et al. ................ 345/184 |
| 2006/0197749 | A1 * | 9/2006 | Popovich ..................... 345/173 |
| 2006/0267962 | A1 * | 11/2006 | Baier ............................ 345/173 |
| 2007/0198141 | A1 * | 8/2007 | Moore ............................. 701/3 |
| 2008/0088600 | A1 * | 4/2008 | Prest et al. ................... 345/173 |
| 2008/0106519 | A1 * | 5/2008 | Murray ......................... 345/169 |
| 2008/0129707 | A1 * | 6/2008 | Pryor ............................ 345/175 |
| 2008/0202278 | A1 | 8/2008 | Klossek et al. |
| 2009/0002328 | A1 * | 1/2009 | Ullrich et al. ................ 345/173 |

FOREIGN PATENT DOCUMENTS

| | | |
|---|---|---|
| EP | 0794089 | 9/1997 |
| EP | 0893750 | 7/2001 |
| EP | 1213165 | 6/2002 |
| EP | 1243997 | 9/2002 |
| FR | 2738196 | 3/1997 |
| FR | 2804240 | 7/2001 |
| GB | 2350170 | 11/2000 |
| JP | 11-067017 | 3/1999 |
| JP | 2007-168639 | 7/2007 |
| WO | WO 00/34067 | 6/2000 |
| WO | WO 2007/009744 | 1/2007 |

* cited by examiner

INTERFACE SYSTEM FOR A ROAD VEHICLE PROVIDED WITH A LIQUID-CRYSTAL DISPLAY AND A CONTROL DEVICE FOR CONTROLLING THE INFORMATION APPEARING ON THE DISPLAY

SECTOR OF THE ART

The present invention relates to an infotelematic system for a road vehicle.

The present invention finds advantageous application in an automobile, to which the ensuing description will make explicit reference, without this implying any loss of generality.

PRIOR ART

With the progress of electronic systems, in the last few years there has been a constant increase in the amount of information that is made available to the driver of an automobile. For example, alongside the traditional possibility of playing music (from a radio station or from a magnetic or else optical storage medium) there has progressively appeared the possibility of using a cellphone in handsfree mode for displaying audiovisual content (for example, a television programme), using the satellite navigation possibly with updating in real time on the traffic conditions, navigating through the Internet, using advanced functions of an on-board information system, etc.

Consequently, there is increasingly felt both the need to organize and display the various information in such a way that the driver will be able to find rapidly all the desired information, without being excessively distracted from driving, and to enable the driver to control the infotelematic system in a way that is ergonomic, i.e., simple (so that he will not have to draw his attention away from driving) and intuitive (so as not to require a long learning process).

Normally, a modern infotelematic system for an automobile comprises a liquid-crystal display set on the dashboard of the automobile and a control device typically set in the proximity of the liquid-crystal display and designed to control the various functions available. In the majority of automobiles on the market, the control device comprises a plurality of pushbuttons, which are set around the liquid-crystal display. However, this kind of control devices is far from ergonomic in so far as it is inconvenient to use (i.e., it requires the driver to take his eyes off the road to see which pushbutton to press) and is often particularly awkward to learn (i.e., it takes some time to learn how to use all the various functions).

EP1243997A2 discloses a vehicle-mounted device control unit provided with an electrical appliance selection switch for selecting an electrical appliance whose function is to be regulated, a manual input device for regulating various functions of the electrical appliance selected with the switch; the manual input device is provided with knobs, actuators for loading external forces on the knobs, and detecting devices for detecting the manipulated states of the knobs, and a controller drives the actuators and carries out force feedback to a user. W00034067A1 discloses an automotive control panel provided with at least one multifunctional switch, for operating in at least two modes, a first mode in which the multifunctional switch controls a parameter of the audio system, and a second mode in which the multifunctional switch controls a parameter of the climate control system, the control panel also including a switch mode selector for selecting the mode of the multifunctional switch. EP1213165A2 discloses a rotating knob provided on a decorative panel of a controller unit in such a way as to be able to rotate around a shaft center; three guideholes are provided along the same virtual circle drawn around the shaft center, and sliding knobs are respectively provided in the guide holes in such a manner as to perform a sliding operation.

DESCRIPTION OF THE INVENTION

The aim of the present invention is to provide an infotelematic system for a road vehicle, said infotelematic system being convenient and inexpensive to produce and being free from the drawbacks described above.

In accordance with the present invention, an infotelematic system for a road vehicle is provided according to what is set forth in the annexed claims.

BRIEF DESCRIPTION OF THE DRAWINGS

The present invention will now be described with reference to the annexed drawings, which illustrate some non-limiting examples of embodiment thereof, and in which.

PREFERRED EMBODIMENTS OF THE INVENTION

Figure 1:
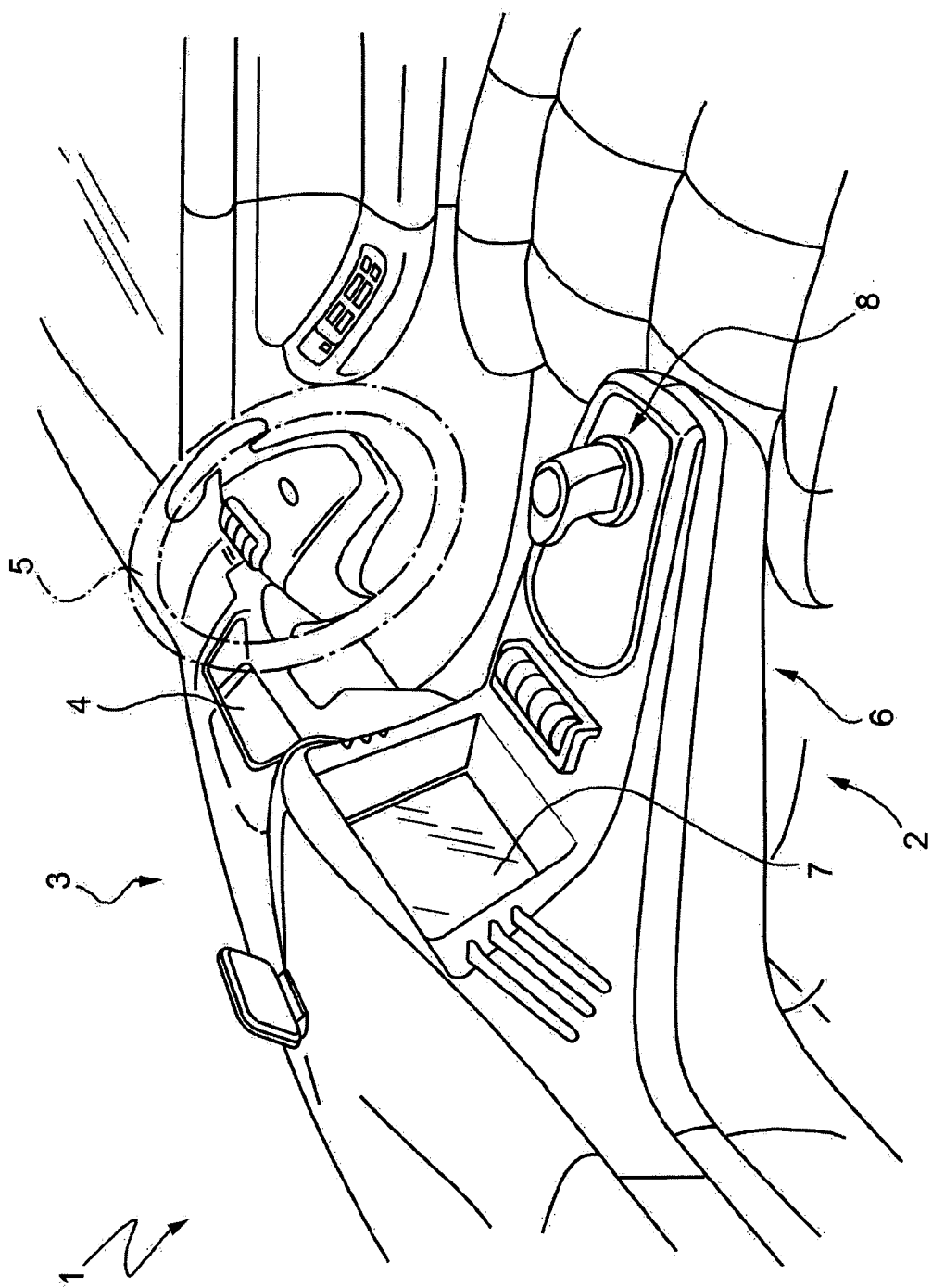
FIG. 1 is a schematic and perspective view of a dashboard of an automobile provided with an infotelematic system made in accordance with the present invention.

In FIG. 1, designated by the number 1 is an automobile provided with a passenger compartment 2, which can accommodate at least a driver and a front passenger seated on respective seats. The passenger compartment 2 is delimited at the front by a transparent windscreen and by a dashboard 3 (which is hence set in a front portion of the passenger compartment 2). In front of the driver, the dashboard 3 supports an instrument panel 4 and a steering wheel 5, which is turned to control an angle of steering of the automobile 1 and is set in front of the driver in front of the instrument panel 4.

The automobile 1 comprises an infotelematic system 6, which is designed to perform numerous functions, amongst which playing music (from a radio station or from a magnetic or else optical storage medium), using a cellphone in hands-free mode, displaying audiovisual content (for example a television programme), using satellite navigation, and using advanced functions of the on-board information system (self-diagnosis of the on-board systems, programmed maintenance, average and instantaneous fuel consumption, etc.).

The infotelematic system 6 comprises a liquid-crystal display 7, which is normally of dimensions such that it can be integrated in a single-DIN or else double-DIN compartment and is set in a central portion of the dashboard 3 between the driver's seat and the front passenger's seat. According to a different embodiment (not illustrated), the display 7 is not set in a central portion of the dashboard 3 between the driver's seat and the front passenger's seat, but is inserted in the instrument panel 4 so as to be set in front of the driver and so as to be visible to the driver through a top opening of the steering wheel 5. According to a further embodiment (not illustrated), in addition to the display 7 a further display is provided, which is inserted in the instrument panel 4 and normally duplicates the information appearing on the display 7 for the benefit of the driver. In this case the display 7 set in a central portion of the dashboard 3 between the driver's seat and the front passenger's seat is basically used by the passengers.

In addition, the infotelematic system 6 comprises a control device 8, which enables control of the information appearing on the display 7 and is set in a central portion of the dashboard 3 in front of the liquid-crystal display 7, and a central processing unit (not illustrated) provided with the control logic. The central processing unit of the infotelematic system 6 can be housed in an independent container set in a hidden position or else can be integrated together with the display 7.

Figure 2:
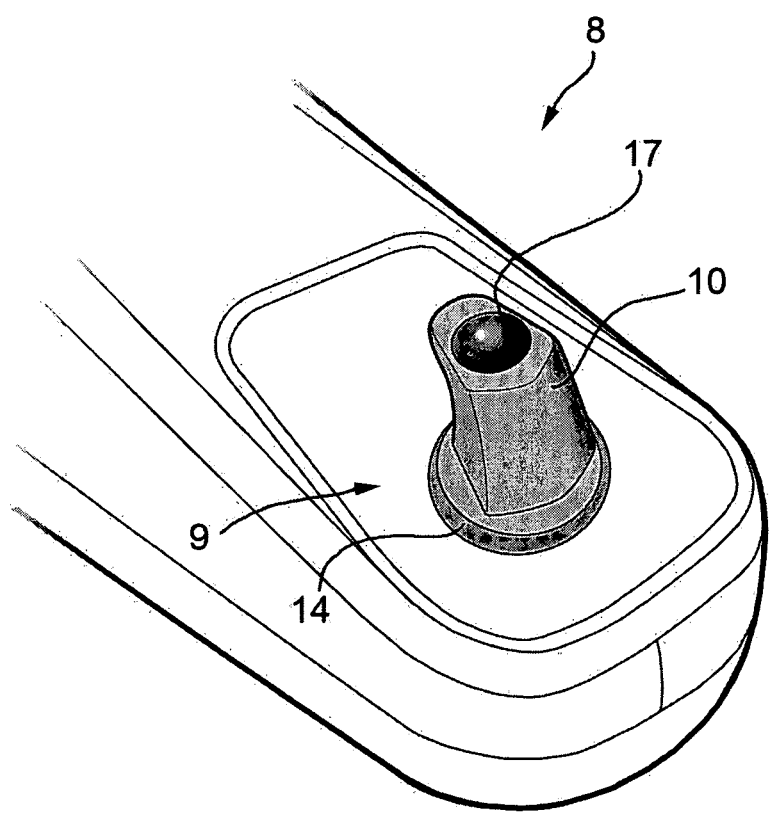
FIG. 2 is a schematic view at an enlarged scale of a control device of the infotelematic system of FIG. 1.
Figure 3:
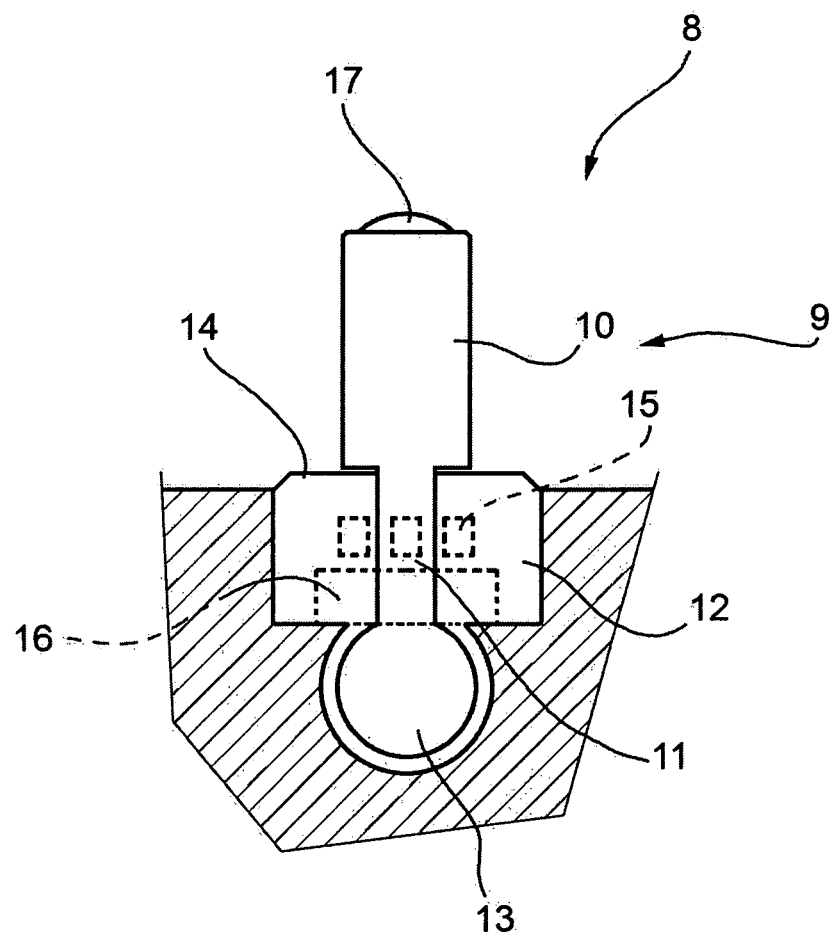
FIG. 3 is a schematic view partially in cross section of the control device of FIG. 2.

According to what is illustrated in FIGS. 2 and 3, the control device 8 is of the joystick type and comprises a bar 9, which has a visible top portion 10 that is shaped so as to be guided by the user's hand (preferably it is gripped between his fingers or alternatively gripped in his hand), and a hidden bottom portion 11, which is inserted within a chamber 12 and is hinged at the bottom by means of a ball joint 13 to be able to turn freely about a central hinge point, i.e., turn freely and simultaneously about two axes coplanar and perpendicular to one another. The chamber 12 is closed at the top by a covering element 14, which is perforated at the centre to enable passage of the bar 9 and is made of deformable plastic material to enable movement of the bar 9 itself.

The bar 9 normally assumes a central resting position, starting from which it can be displaced in all the directions of a plane. The control device 8 comprises four electromechanical or else optical sensors 15, which are arranged in the chamber 12 and are symmetrically distributed about the bottom portion 11 of the bar 9 to read the position of the bar 9 itself and in particular to detect eight significant positions: the four direct positions (forwards, backwards, right and left) and the four mixed positions (forward-right, forward-left, back-right and back-left).

In addition, the control device 8 comprises a haptic actuator 16, which is coupled to the bottom portion 11 of the bar 9 to vary the effort necessary for displacement of the bar 9 itself. In other words, the haptic actuator 16 is able to supply a feedback of force to the user who grips the bar 9 for guiding displacement of the bar 9 itself. By way of example, the haptic actuator 16 could comprise a pair of electric servo motors (one for each axis of rotation) coupled to the bar 9 by means of a gear transmission, or else the haptic actuator 16 could comprise a pair of magnetorheological or electrorheological servo motors (one for each axis of rotation) directly coupled to the bar 9. Preferably, the haptic actuator 16 keeps the bar 9 in the central resting position. Alternatively, the bottom portion 11 of the bar 9 could be coupled to elastic elements, which are arranged in the chamber 12 and, in the absence of external forces, are designed to keep the bar 9 itself in a central resting position.

According to a preferred embodiment, the bar 9 carries an activation pushbutton 17, which is mounted in a horizontal top face of the bar 9. Preferably, the user displaces the bar 9 for selecting on the display 7 the desired option from amongst the various options displayed and presses the pushbutton 17 to activate the selected option. In other words, when on the display 7 a number of options are displayed by displacement of the bar 9, the user can select the desired option (for example, by displacing a selection cursor on the desired option) and then presses the activation pushbutton 17 for activating the selected option. According to two different embodiments (not illustrated), the activation pushbutton 17 is set in front of the bar 9 (hence it is not supported by the bar 9) or else it is integrated in the stem of the bar 9 (hence it is not mounted in a horizontal top face of the bar 9).

Figure 4:
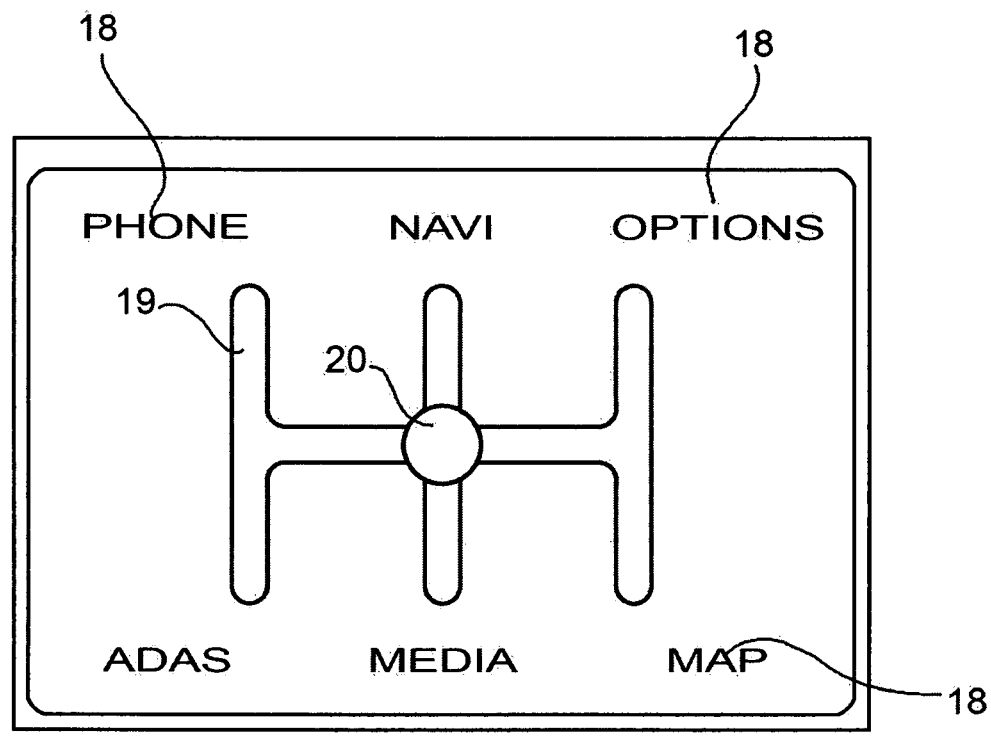
FIGS. 4, 5 and 6 illustrate some screenfuls that are displayed in a liquid-crystal display of the infotelematic system of FIG. 1.
Figure 4:
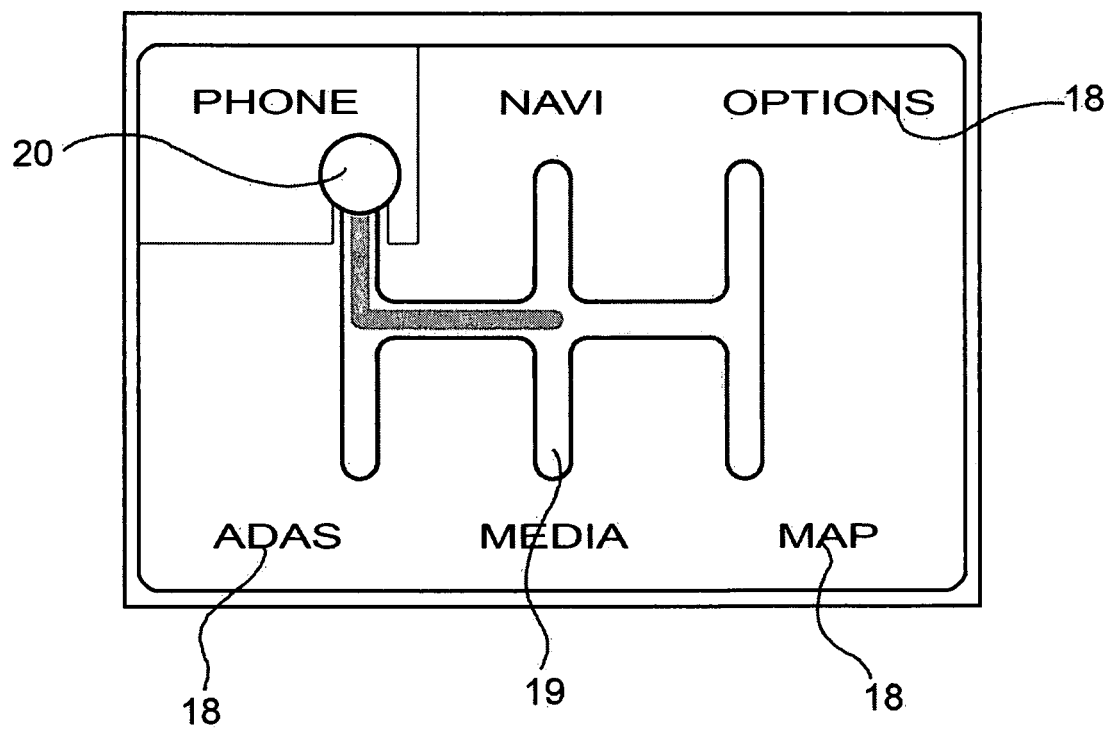

In FIG. 4 two screenfuls are shown, which can be displayed on the display 7 for making the selection from among a set of selectable options 18. In the two screenfuls illustrated in FIG. 4 six different options 18 are displayed ("Phone", "Navi", "Options", "Adas", "Media" and "Map"), which are set at the six vertices of a path 19 that has the shape of a selection scheme of a motor-vehicle gear change. In the two screenfuls, it is possible to appreciate the position of a selection cursor 20 that is initially set in a central neutral position and is then displaced to the right and upwards with corresponding movements of the bar 9 for selecting the option 18 "Phone". The function of the selection cursor 20 that is displaced by the movement of the bar 9 is that of indicating a current position of selection, i.e., indicating from amongst the various options 18 the option 18 currently selected. In other words, appearing on the display 7 is a selection cursor 20, which is displaced by the movement of the bar 9 and indicates a current position of selection. When the activation pushbutton 17 mounted on the bar 9 is pressed, the option 18 is selected corresponding to the position in which the selection cursor 20 is set at the moment when the activation pushbutton 17 is pressed.

In the case where a certain position of the bar 9 does not correspond to any selectable option, the haptic actuator 16 is operated to prevent or at least render problematical (i.e., require a high force compatibly with the performance of the haptic actuator 16) displacement of the bar 9 into said position. For example, if in the screenfuls illustrated in FIG. 4, the option "Media" were not selectable (bar 9 downwards), then the haptic actuator 16 would be operated to prevent or at least render problematical displacement of the bar 9 downwards.

In addition, the haptic actuator 16 coupled to the bar 9 is governed to allow the bar 9 itself to perform only movements that reproduce the path 19 appearing on the display 7. For example, in the top screenful of FIG. 4 the selection cursor 20 is set in a central position of the path 19, which in this position has the possibility of performing horizontal or vertical movements, and hence the haptic actuator 16 is governed to allow the bar 9 to perform only horizontal or vertical movements (up, down, right and left) and not oblique movements. In the bottom screenful of FIG. 4, the selection cursor 20 is set in a lateral position of the path 19, which in this position has only the possibility of a vertical movement downwards, and hence the haptic actuator 16 is governed so as to allow the bar 9 to perform only a vertical movement downwards.

In other words, appearing on the display 7 is a set of selectable options 18, and the position of the bar 9 of the control device 8 is detected for determining the option 18 selected by the user from amongst the selectable options 18 appearing on the display 7. Appearing on the display 7 is the path 19, set along which are the selectable options 18, and the haptic actuator 16 coupled to the bar 9 is governed to allow the bar 9 itself to perform only movements that reproduce the path 19 appearing on the display 7.

Governing the haptic actuator 16 to allow the bar 9 to perform only movements that reproduce the path 19 appearing on the display 7 envisages requiring a minimum effort for displacing the bar 9 according to the path 19 appearing on the display 7 and requiring a maximum effort (i.e., the maximum possible effort enabled by the capacity of the haptic actuator 16) for displacing the bar 9 in a different way from the path 19 appearing on the display 7. It should be pointed out that the haptic actuator 16 presents physical limits, and hence a user who exerts on the, bar 9 a sufficiently high force could overcome the action of the haptic actuator 16 and displace the bar 9 in a way different from what is envisaged by the path 19 appearing on the display 7.

Figure 5:
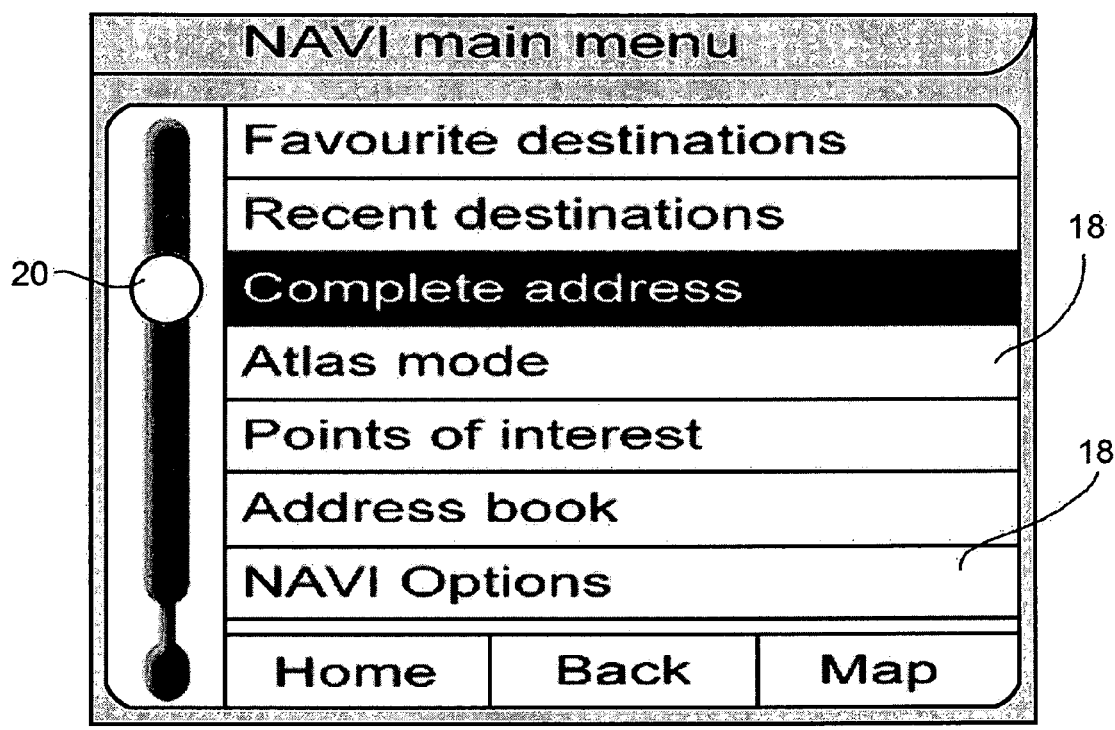

FIG. 5 illustrates a further screenful that can appear on the display 7 for making a selection from among some selectable options 18. In the screenful illustrated in FIG. 5 seven different options 18 are displayed ("Favourite destinations", "Recent destinations", "Complete address", "Atlas mode", "Points of interest", "Address book" and "NAVI Options") which are arranged to form a vertical list in which the options 18 themselves are set on top of one another. In this case, identified in the list of the selectable options 18 is a central position (corresponding, in this particular case, to the option "Atlas mode"), and the selectable options 18 are split into a top half list (comprising "Favourite destinations", "Recent destinations" and "Complete address"), set above the central position, and a bottom half list (comprising "Points of interest", "Address book" and "NAVI Options"), set below the central position. In addition, the haptic actuator 16 coupled to the bar 9 is governed to allow the bar 9 itself to perform only vertical movements downwards and upwards starting from a central position of the bar 9, and the haptic actuator 16 is governed so as to divide each arc of movement of the bar 9 downwards or upwards into a plurality of selection positions set at angular distances from one another and each of which corresponds to a respective selectable option 18 of a respective bottom or top half list. By way of example, if the arc of movement of the bar 9 envisages, starting from a central position, a rotation through 30° in the two directions, to a rotation through 10° downwards there corresponds "Points of interest", to a rotation through 20° downwards there corresponds "Address book", and to a rotation through 30° downwards there corresponds "NAVI Options"; likewise, to a rotation through 10° upwards there corresponds "Complete address", to a rotation through 20° upwards there corresponds "Recent destinations", and to a rotation through 30° upwards there corresponds "Favourite destinations".

It should be emphasized that the layout of the screenful illustrated in FIG. 5 and described above enables minimization of the movements made by the user's hand to complete the possible selections.

According to a preferred embodiment, the haptic actuator 16 coupled to the bar 9 is governed so as to require a peak of effort for abandoning a position of selection corresponding to a respective selectable option 18. In other words, each position of selection corresponding to a respective selectable option 18 constitutes a point of relative minimum of the effort necessary for displacing the bar 9. In this way, for a user it is simple and intuitive to identify a position of selection corresponding to a respective selectable option 18.

In the arc of movement of the bar 9 downwards there could be inserted a further end selection position, which is located in the bottom end position and corresponds to an option of return to a top menu (identified in the screenful of FIG. 5 with the label "Home"). Said feature is important in so far as it enables a user to select in a simple, fast and intuitive way the option of return to a top menu, which is one of the most widely used options.

Also in the screenful of FIG. 5 the selection cursor 20 is present, which is displaced by the movement of the bar 9 and indicates a current position of selection. As has been described previously, the pressure upon the activation pushbutton 17 mounted on the bar 9 is detected, and the option 18 corresponding to the position in which the selection cursor 20 is set at the moment when the activation pushbutton 17 is pressed is selected.

Figure 7:
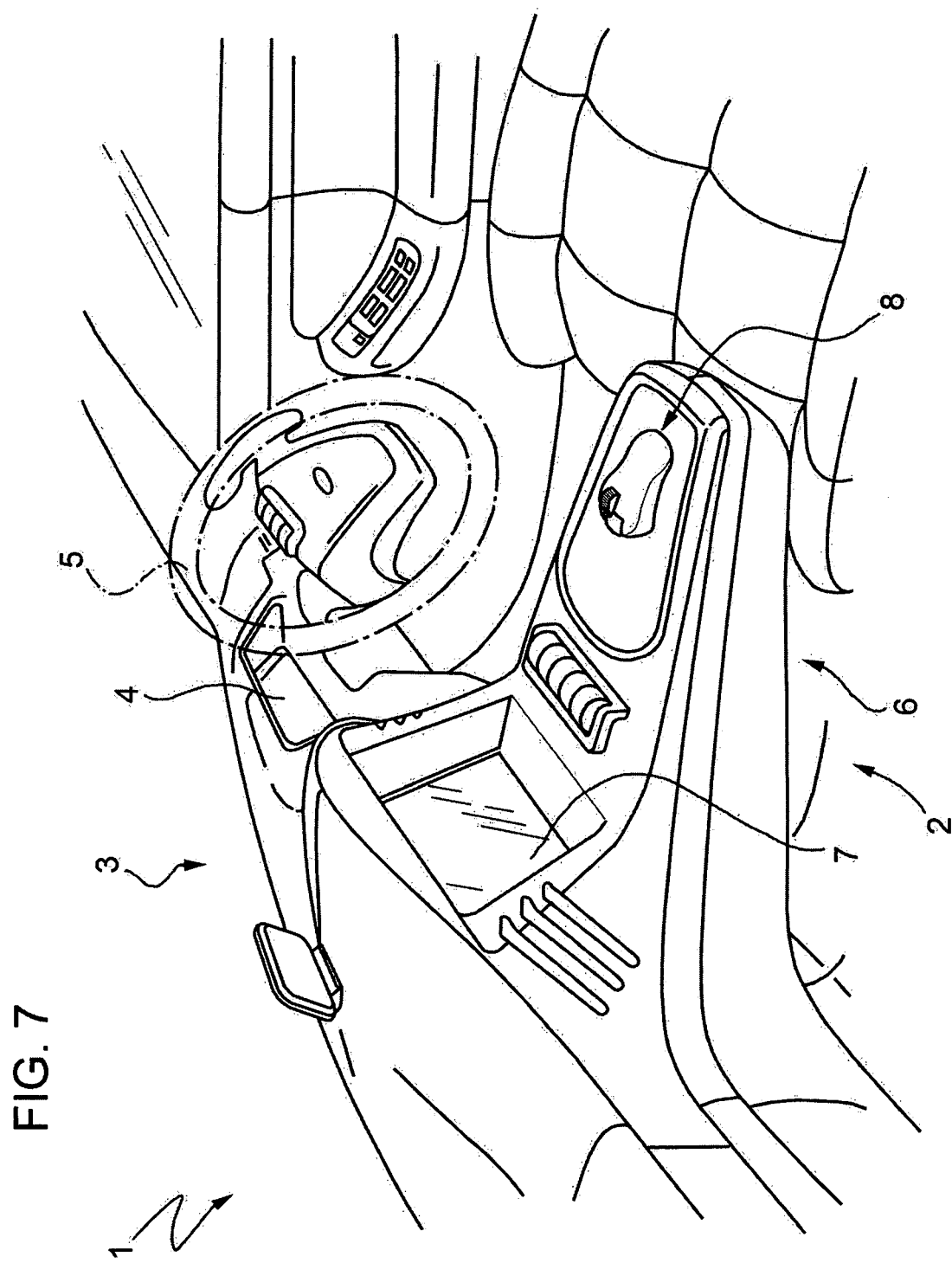
FIG. 7 is a schematic and perspective view of a dashboard of an automobile provided with an alternative embodiment of an infotelematic system made in accordance with the present invention.
Figure 8:
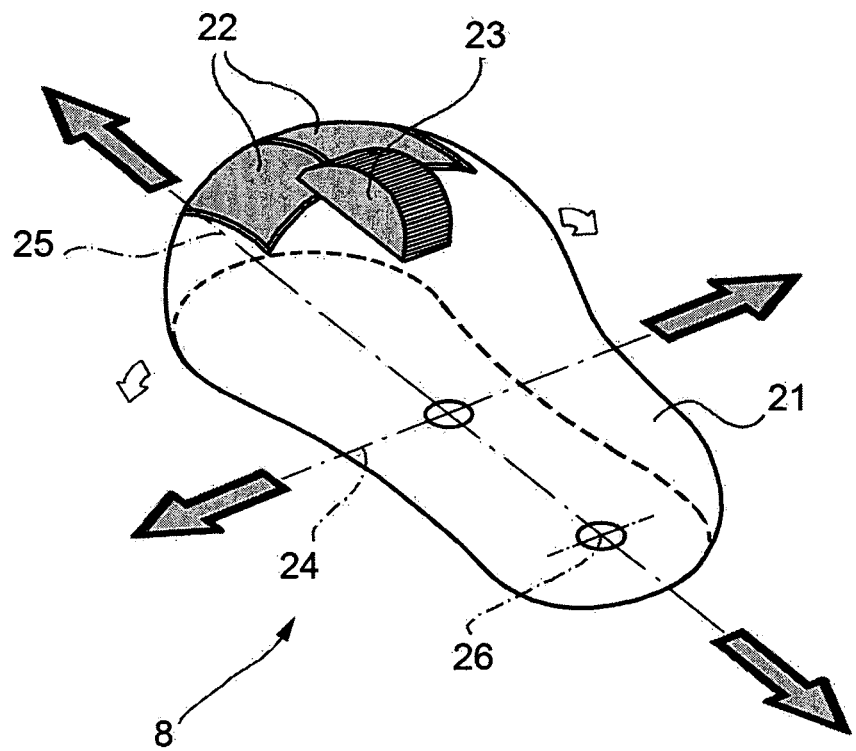
FIG. 8 is a schematic view at an enlarged scale of a control device of the infotelematic system of FIG. 7.
Figure 9:
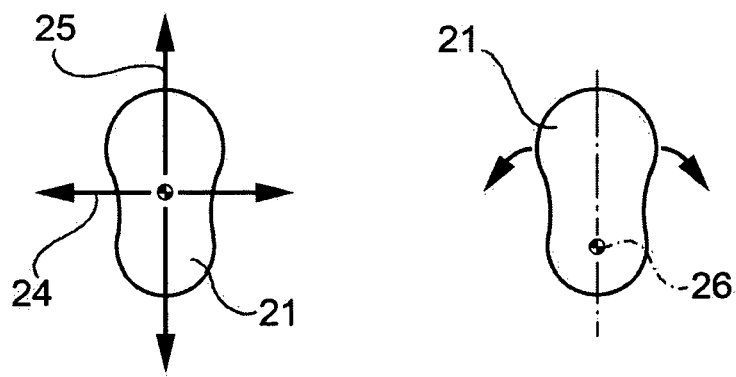
FIG. 9 is a schematic illustration of the possibilities of movement of the control device of FIG. 8.

FIG. 7 illustrates the dashboard 3 provided with a different control device 8, which is of the mouse type and comprises a grippable element 21 that is shaped like the mouse of a computer. According to what is illustrated in FIGS. 8 and 9, the grippable element 21 has in a front position a pair of pushbuttons 22 and a wheel 23 that is coupled to a haptic actuator (integrated within the grippable element 21 and not illustrated). According to a different embodiment (not illustrated), the pair of pushbuttons 22 and the wheel 23 are separate from the grippable element 21 and are set in front of the grippable element 21 itself.

The grippable element 21 presents a movement of rototranslation that envisages movements of translation in two directions 24 and 25 of translation perpendicular to one another and a rotation about an axis 26 of rotation. According to a preferred embodiment, the axis 26 of rotation is set staggered with respect to the point of crossing-over of the two directions 24 and 25 of translation. In particular, the point of crossing-over of the two directions 24 and 25 of translation is set in a central position of the grippable element 21, whilst the axis 26 of rotation is set in a set-back position of the grippable element 21. The eccentricity of the axis 26 of rotation with respect to the point of crossing-over of the two directions 24 and 25 of translation enables a better control of the position of the grippable element 21 preventing a movement of translation from being erroneously imparted on the grippable element 21 instead of a movement of rotation, and vice versa.

Figure 6:
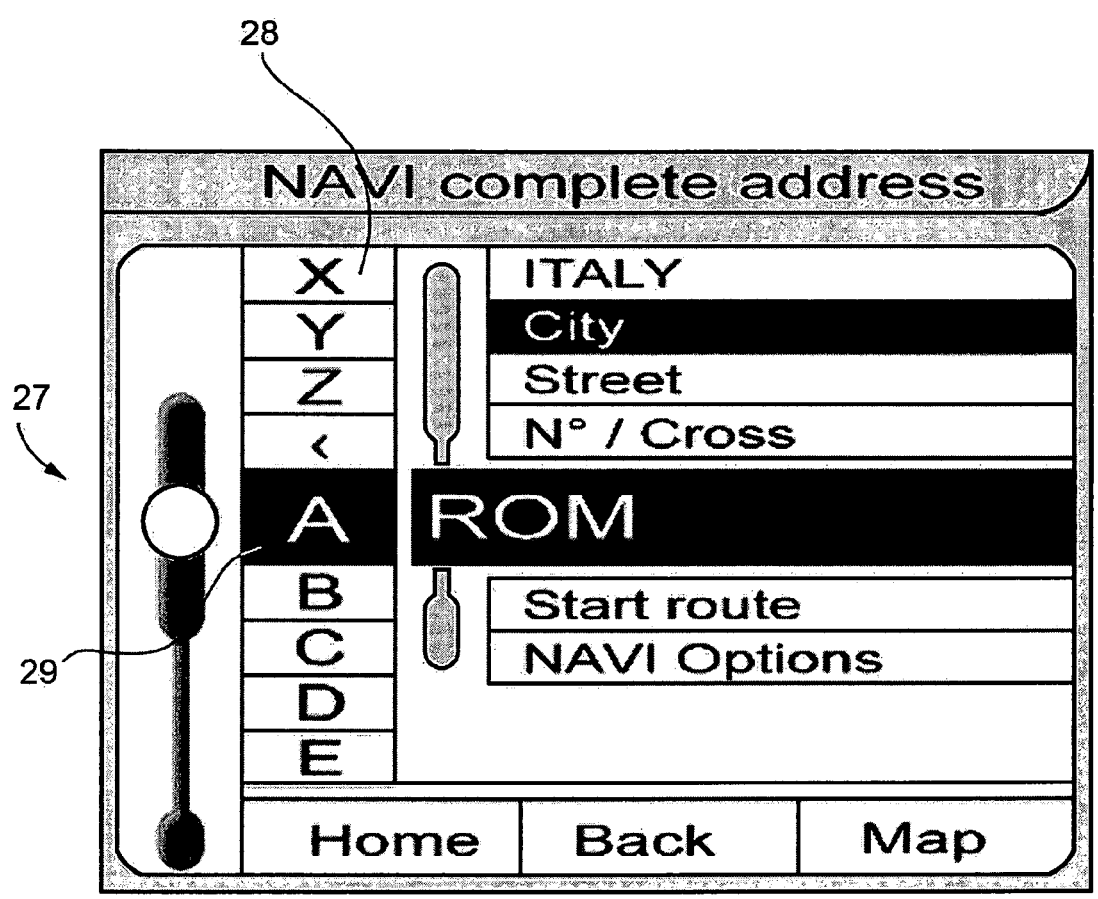
Figure 10:
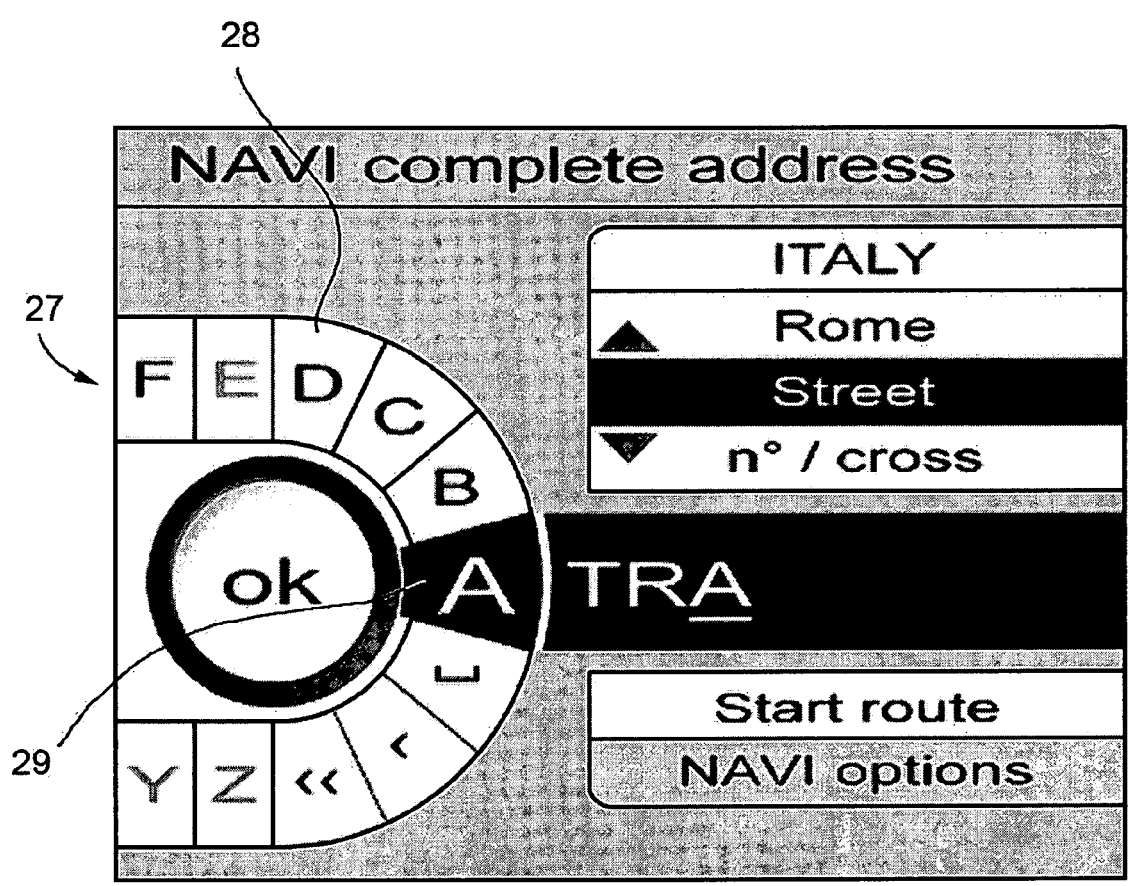
FIG. 10 illustrates a screenful that is displayed in a liquid-crystal display of the infotelematic system of FIG. 7.

FIGS. 6 and 10 illustrate two alternative screenfuls that can appear on the display 7 to provide a virtual keypad comprising an orderly succession of alphanumeric characters. The virtual keypad of FIGS. 6 and 10 comprises a path 27 closed to form a loop (i.e., in which the end of the path 27 connects up to the start of the path 27) made up of a succession of boxes 28, each of which contains a respective alphanumeric character. Appearing on the display 7 is only a part (obviously variable) of the closed path 27 presenting a limited number of boxes 28 (typically 8-12).

In addition, the virtual keypad of FIGS. 6 and 10 comprises a selection window 29, which is set superimposed on the closed path 27 and highlights the box 28 of the path 27 and hence the respective alphanumeric character currently selected. By means of the control device 8 (the joystick control device 8 illustrated in FIGS. 1-3 or the mouse control device 8 illustrated in FIGS. 7-9) it is possible to scroll the closed path 27 forwards or backwards with respect to the selection window 29. In addition, pressure upon an activation pushbutton 17 or 22 of the control device 8 is detected in such a way as to enable selection of the alphanumeric character present within the selection window 29 at the moment of pressure upon the activation pushbutton 17 or 22.

By means of the joystick control device 8 illustrated in FIGS. 1-3, the movement of the bar 9 is used for scrolling the closed path 27 forwards or backwards with respect to the selection window 29. In this case, the haptic device 16 coupled to the bar 9 enables jumping upwards or downwards for scrolling the closed path 27 forwards or backwards with respect to the selection window 29. Jumping upwards or downwards envisages that, starting from a central position, the bar 9 will be displaced upwards or downwards and then return automatically in the central position (in other words, the haptic device 16 simulates the behaviour of an elastic means that tends to keep the bar 9 in the central position). The movements to the right and to the left of the bar 9 can be used to erase the last character selected and/or to pass to another selection menu illustrated in the right-hand part of the screenful of FIG. 6.

By means of the mouse control device 8 illustrated in FIGS. 7-9, the wheel 23 is used for scrolling the closed path 27 forwards or backwards with respect to the selection window 29. In this case, the haptic device coupled to the wheel 23 impresses a movement of jumpy rotation on the wheel 23 itself in the two directions of rotation for scrolling the closed path 27 forwards or backwards with respect to the selection window 29. The jumpy rotation envisages that the haptic device coupled to the wheel 23 will be governed so as to require a peak of effort for abandoning an angular position of selection. In other words, each angular position of selection constitutes a point of relative minimum of the effort necessary to turn the wheel 23.

According to a different embodiment (not illustrated), the virtual keypad of FIG. 10 is not controlled by the wheel 23 (having horizontal axis of rotation) of the mouse control device 8 illustrated in FIGS. 7-9, but is controlled by a turnable knob with vertical axis of rotation that constitutes a further type of control device 8 and is coupled to a haptic device for adjusting the force necessary to turn the turnable knob itself.

It should be noted that in the screenful illustrated in FIG. 6, scrolling of the closed path 27 with respect to the selection window 29 occurs by means of a vertical rectilinear movement of the bar 9, and hence the closed path 27 has a vertical rectilinear conformation (i.e., it extends vertically from top downwards). Instead, in the screenful illustrated in FIG. 10, scrolling of the closed path 27 with respect to the selection window 29 occurs by means of a movement of rotation of the wheel 23, and hence the closed path 27 has a circular conformation. In this way, the representation on the display 7 of the closed path 27 reproduces the type of movement required for determining scrolling of the closed path 27 with respect to the selection window 29.

Preferably, as illustrated in FIGS. 6 and 10, within the selection window 29, the alphanumeric character is reproduced at an enlarged scale.

According to a preferred embodiment, each time there are determined the alphanumeric characters allowed during composition of an alphanumeric string. In this case, it is possible to scroll within the selection window 29 only the boxes 28 corresponding to alphanumeric characters allowed, or else it is possible to eliminate from the closed path 27 the boxes 28 corresponding to alphanumeric characters not allowed.

According to what has been described above, it is evident that the haptic device 16 is governed so as to vary its own behaviour according to what is represented on the display 7 and hence so as to adapt to what is represented on the display 7. In other words, the haptic device 16 is not governed always in the same way, but the way of governing the haptic device 16 is adapted each time to what is represented on the display 7.

In addition, according to what is described above, it is evident that what appears on the display 7 is always adapted to the shape and above all the possible movements of the control device 8 in such a way that, for the user who is looking at the display 7 it will be intuitive and readily understandable which movements he has to impress upon the control device 8 to navigate through the information (i.e., the selectable options 18) appearing on the display 7. In other words, when the control device 8 has a main movement of translation, then the information (i.e., the selectable options 18) appearing on the display 7 are organized so as to be set along a path made up of rectilinear stretches, whilst, when the control device 8 has a main movement of rotation, then the information (i.e., the selectable options 18) appearing on the display 7 are organized so as to be set along a circular path.

Figure 11:
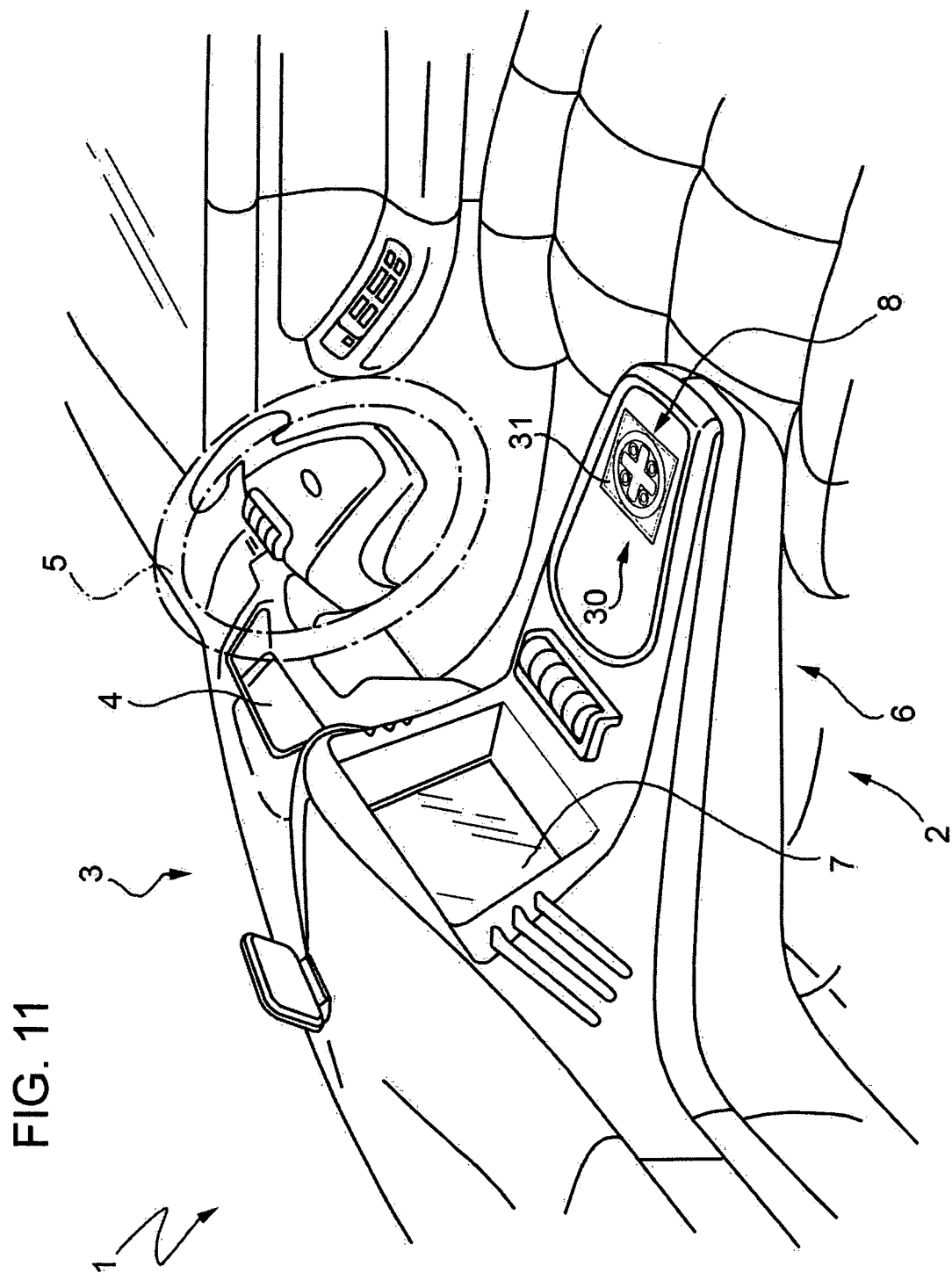
FIG. 11 is a schematic and perspective view of a dashboard of an automobile provided with a further embodiment of an infotelematic system made in accordance with the present invention.

FIG. 11 illustrates the dashboard 3 provided with a further control device 8 of the touchpad type and comprises a plane plate 30 presenting a top surface 31 in view.

Figure 12:
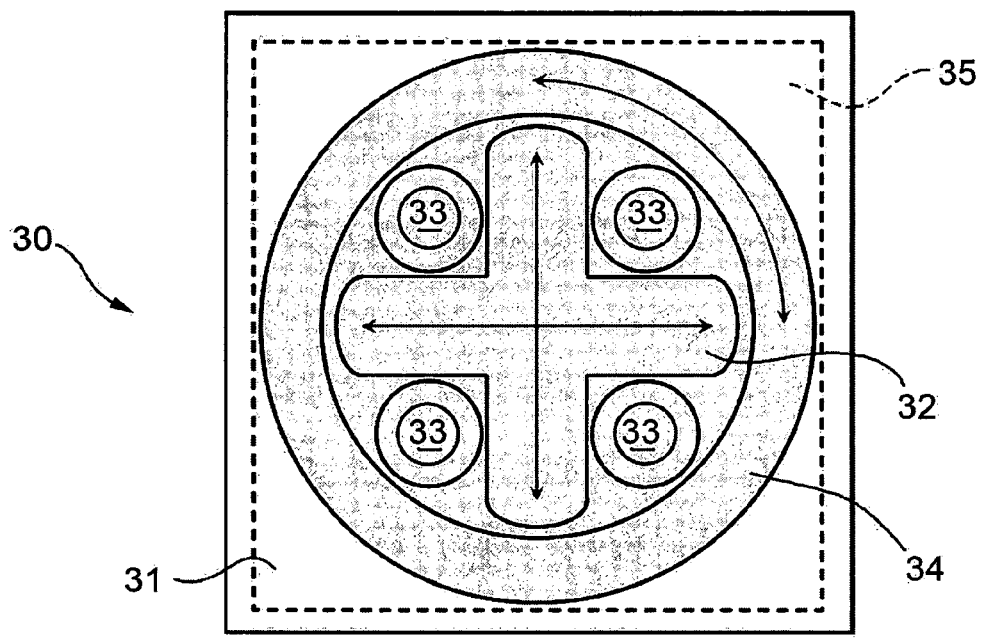
FIG. 12 is a schematic plan view at an enlarged scale of a control device of the infotelematic system of FIG. 11.

According to what is illustrated in FIG. 12, the control device 8 comprises a cross-shaped path 32, which is obtained on the top surface 31 of the plane plate 30 and is made of touch-sensitive material, four pushbuttons 33, which are obtained on the top surface 31 of the plane plate 30, are made of touch-sensitive material, and are symmetrically arranged in the four quadrants defined by the cross-shaped path 32, and a circular closed path 34, which is obtained on the top surface 31 of the plane plate 30, is made of touch-sensitive material, and surrounds the cross-shaped path 32. In addition, the control device 8 comprises a sensor device 35 coupled to the plane plate 30 for detecting a tactile pressure on the cross-shaped path 32, on the pushbuttons 33, and on the circular closed path 34.

Preferably, the cross-shaped path 32, the pushbuttons 33, and the circular closed path 34 are highlighted by means of a differentiation of colouring and/or a differentiation of height (i.e., said parts are set in for guiding positioning of the user's fingers) with respect to the rest of the top surface 31 of the plane plate 30. In this way, the cross-shaped path 32, the pushbuttons 33, and the circular closed path 34 provide the user with a visual feedback (colouring) and/or a tactile feedback (height) with respect to the rest of the top surface 31 of the plane plate 30, thus facilitating their identification.

Preferably, the plane plate 30 has at the top an aluminium plate that constitutes the top surface 31 of the plane plate 30, and the sensor device 35 comprises a piezoelectric film (or, alternatively, a capacitive film) set immediately underneath the aluminium plate and embedded within the plane plate 30.

Figure 13:
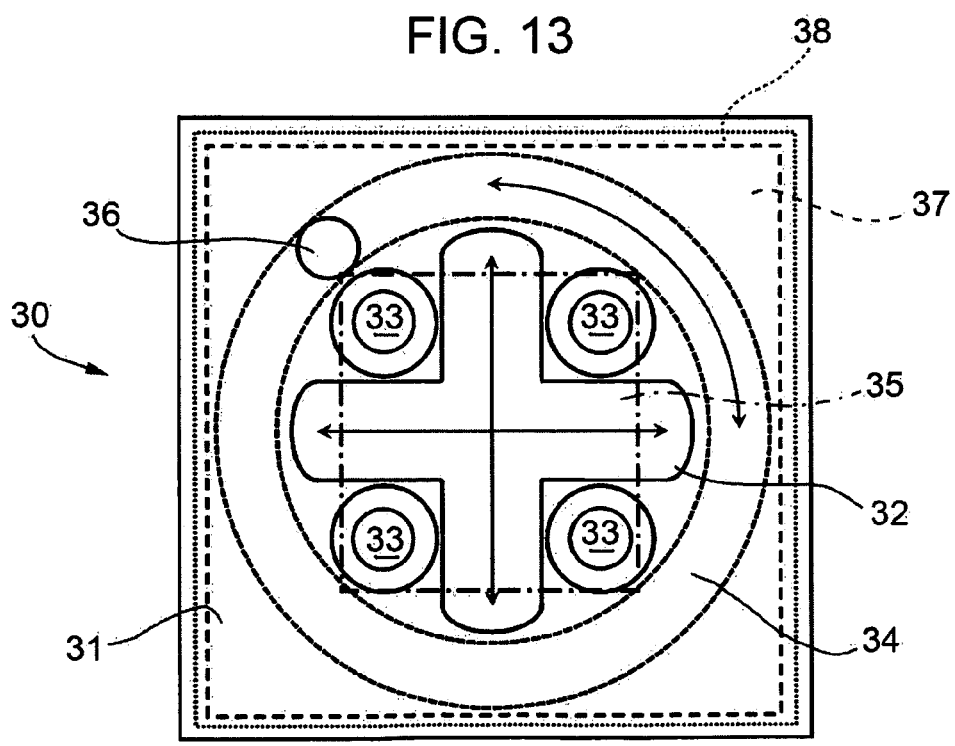
FIG. 13 illustrates a variant of the control device of FIG. 12.

According to the variant illustrated in FIG. 13, the circular closed path 34 is not made of touch-sensitive material and constitutes the sliding path of a slider 36, which is mounted so as to slide along the circular closed path 34 under the thrust of the user's finger. A further sensor device 37 is provided, coupled to the plane plate 30, for detecting the position of the slider 36 along the circular closed path 34. Preferably, the control device 8 comprises a haptic actuator 38, which is coupled to the slider 36 for varying the force necessary to displace the slider 36 itself along the circular closed path 34.

According to a different embodiment (not illustrated), the control device 8 illustrated in FIGS. 12 and 13 is without the cross-shaped path 32 and comprises only the pushbuttons 33 (which can be four or else also a different number generally comprised between three and six) and the circular closed path 34.

Figure 14:
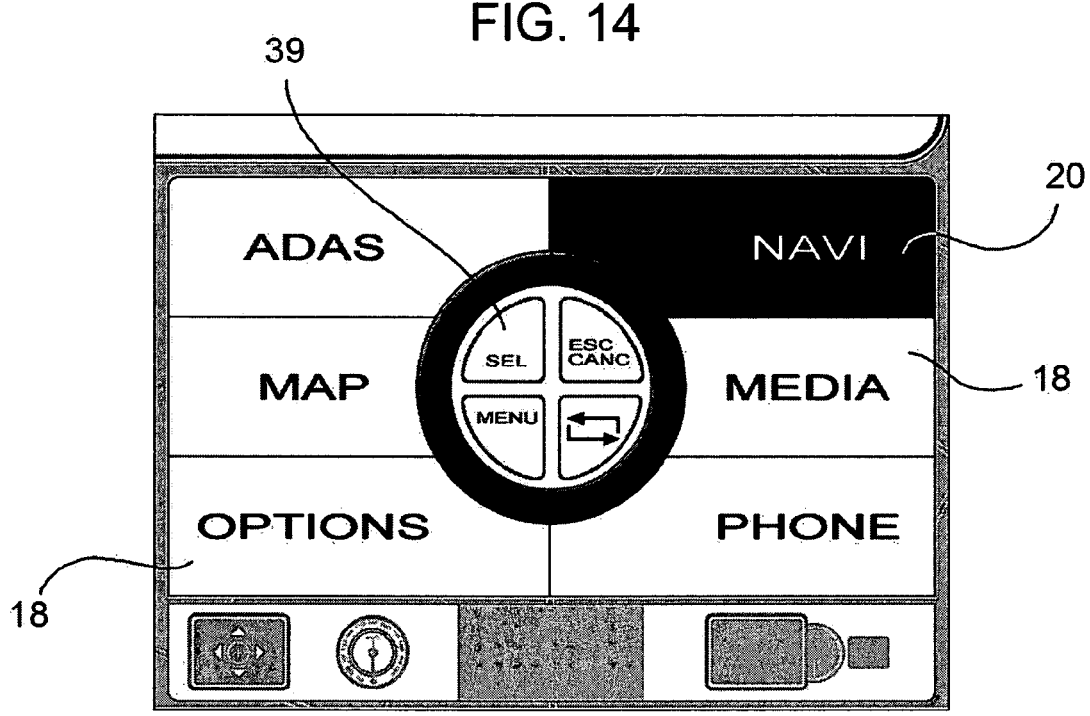
FIGS. 14-17 illustrate some screenfuls that are displayed in a liquid-crystal display of the infotelematic system of FIG. 11.

FIG. 14 shows a screenful that can appear on the display 7 for making the selection from amongst a set of selectable options 18. In the screenful illustrated in FIG. 14 six different options 18 are displayed ("Adas", "Navi", "Map", "Media", "Options", "Phone") and a synoptic image 39 that reproduces the shape of the control device 8 indicating the functions associated to the four pushbuttons 33 of the control device 8 itself. In particular, by using the closed path 34 of the control device 8 it is possible to choose an option 18, whilst by pressing a pushbutton 33 of the control device 8 that carries out the function of activation it is possible to select the option 18 chosen. In particular, the option 18 chosen is highlighted by a selection cursor 20, which, as has already been said, is shifted according to the closed path 34 of the control device 8.

Figure 15:
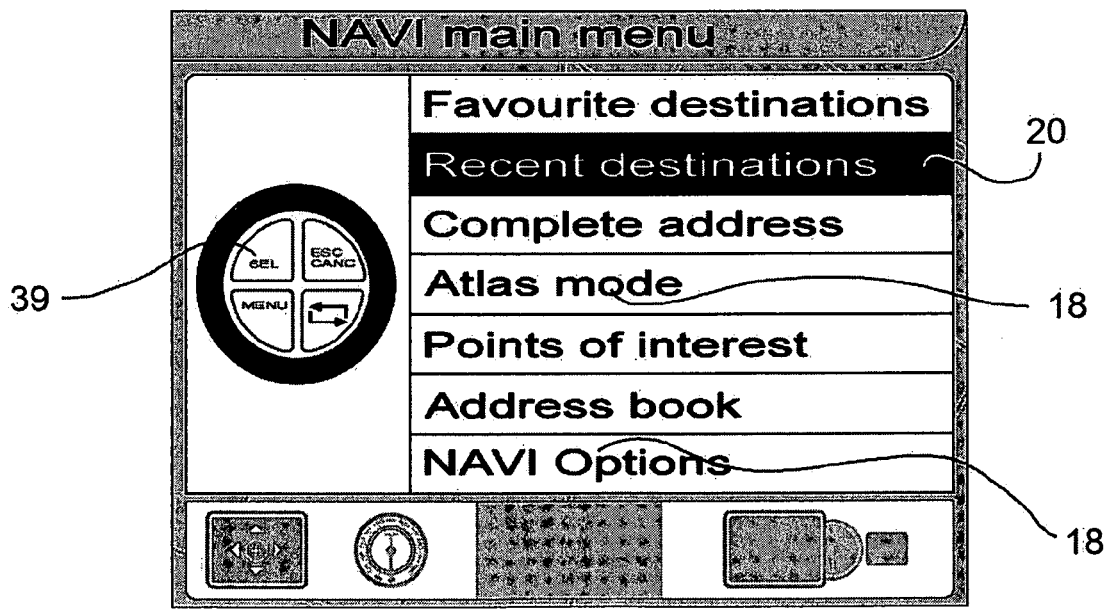

FIG. 15 illustrates a further screenful that can appear on the display 7 for making a selection from amongst some selectable options 18. In the screenful illustrated in FIG. 15 seven different options 18 are displayed ("Favourite destinations", "Recent destinations", "Complete address", "Atlas mode", "Points of interest", "Address book" and "NAVI Options"), which are ordered so as to form a vertical list in which the options 18 themselves are set on top of one another.

In addition, in the screenful illustrated in FIG. 15 a synoptic image 39 is displayed, which reproduces the shape of the control device 8 indicating the functions associated to the four pushbuttons 33 of the control device 8 itself. In particular, by using the closed path 34 of the control device 8 it is possible to choose an option 18, whilst by pressing a pushbutton 33 of the control device 8 that carries out the function of activation it is possible to select the option 18 chosen. In particular, the option 18 chosen is highlighted by a selection cursor 20, which, as has already been said, is displaced according to the closed path 34 of the control device 8.

Figure 16:
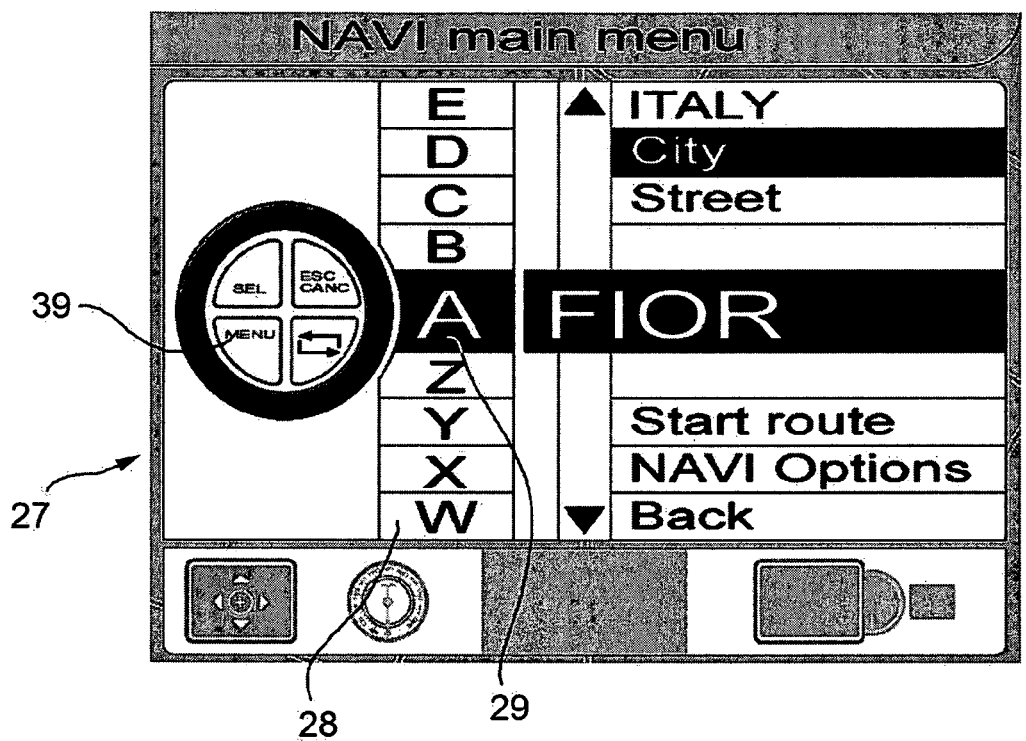
Figure 17:
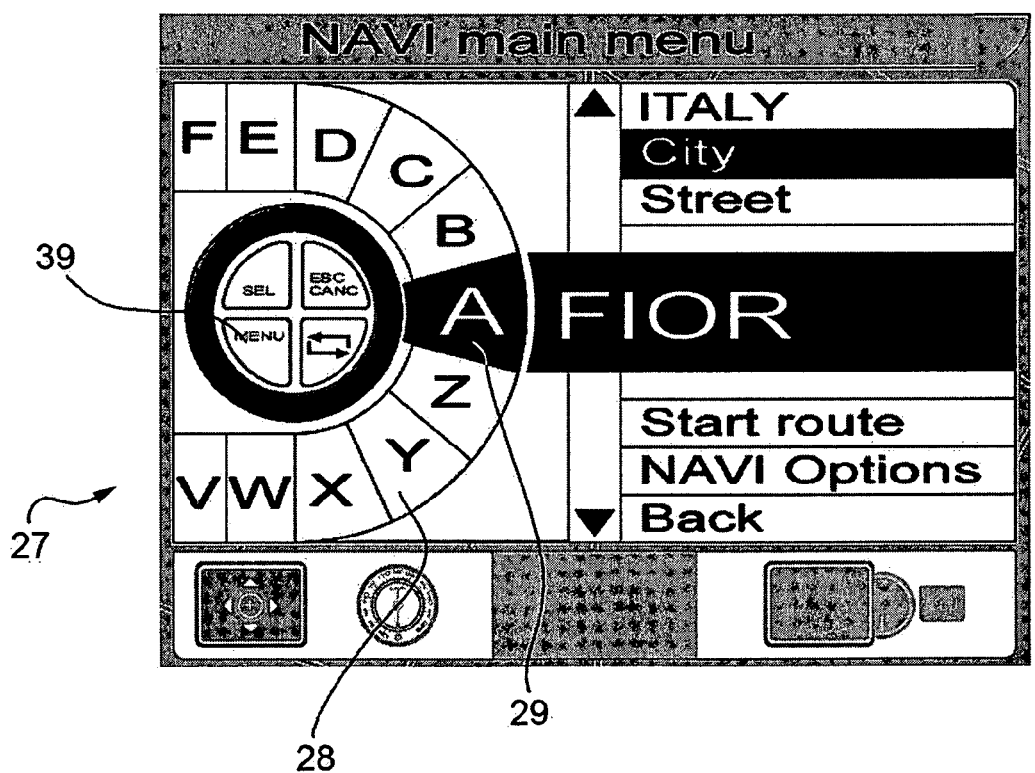

FIGS. 16 and 17 illustrate two alternative screenfuls that can appear on the display 7 for providing a virtual keypad comprising an orderly succession of alphanumeric characters. In the screenfuls illustrated in FIGS. 16 and 17 also a synoptic image 39 is displayed, which reproduces the shape of the control device 8 indicating the functions associated to the four pushbuttons 33 of the control device 8 itself. The virtual keypad of FIGS. 16 and 17 is altogether similar to the virtual keypad of FIGS. 6 and 10 and comprises a closed-loop path 27 (i.e., the end of the path 27 connected up to the start of the path 27) made up of a succession of boxes 28, each of which contains a respective alphanumeric character. Appearing on the display 7 is only a part (obviously variable) of the closed path 27 presenting a limited number of boxes 28 (typically 8-12).

In addition, the virtual keypad of FIGS. 16 and 17 comprises a selection window 29, which is set on top of the closed path 27 and highlights the box 28 of the path 27 and hence the respective alphanumeric character currently selected. By means of the closed path 34 of the control device 8, it is possible to scroll forwards or backwards the closed path 27 with respect to the selection window 29. In addition, the pressure upon an activation pushbutton 33 of the control device 8 is detected in such a way as to select the alphanumeric character present within the selection window 29 at the moment of pressure upon the activation pushbutton 33 (another key 33 of the control device 8 can be used for erasing the last selected character).

Preferably, as illustrated in FIGS. 16 and 17, within the selection window 29 the alphanumeric character is reproduced at an enlarged scale.

According to a preferred embodiment, each time there are determined the alphanumeric characters allowed during composition of an alphanumeric string. In this case, it is possible to scroll within the selection window 29 only the boxes 28 corresponding to alphanumeric characters allowed, or else it is possible to eliminate from the closed path 27 the boxes 28 corresponding to alphanumeric characters not allowed.

The control device 8 illustrated in FIGS. 11, 12 and 13 presents numerous advantages in so far as it has very contained dimensions (in particular, it is extremely slim) and hence is simple to place and install in a dashboard of a motor vehicle and moreover presents a high reliability, given that it does not present moving parts (embodiment of FIG. 12) or else it has a very limited number of moving parts (embodiment of FIG. 13).

The infotelematic system 1 described above presents numerous advantages, in so far as it is easy and inexpensive to produce and above all enables the driver to control the infotelematic system 1 in an ergonomic way, i.e., in a way convenient to use (without requiring the driver to take his eyes off the road so as to look at the control device) and simple to learn.

In the light of the numerous advantages presented, the infotelematic system 1 described above can be used in any other type of road vehicle, such as, for example, a bus, a van, or a lorry.

The invention claimed is:

1. An infotelematic system for a road vehicle, comprising:
at least one liquid-crystal display; and
a control device for controlling the information appearing on the display and comprising a plane plate presenting a top surface in view;
wherein the control device comprises:
a first cross-shaped path, which is obtained on the top surface of the plane plate, is made of touch-sensitive material, and is constituted by two continuous elongated areas of touch-sensitive material that are perpendicular each to other and do not present any interruption of the touch-sensitive material;
a second, closed, path of a circular shape, which is obtained on the top surface of the plane plate, is made of touch-sensitive material, and surrounds the first cross-shaped path;
a slider, which is slidably mounted so as to slide along the circular closed path under the thrust of the user's finger;
a first sensor device coupled to the plane plate for detecting a tactile pressure on the first cross-shaped path and to detect a tactile pressure on the second circular closed path;
wherein the first cross-shaped path is highlighted by means of a differentiation of height with respect to the rest of the top surface of the plane plate;
wherein the plane plate has at the top an aluminum plate that constitutes the top surface of the plane plate; and
wherein the first sensor device comprises a sensitive film set immediately underneath the aluminum plate.

2. The infotelematic system according to claim 1, wherein the control device comprises a plurality of pushbuttons, which are different and separated from the first cross-shaped path, are provided on the top surface of the plane plate, are made of touch-sensitive material, and are symmetrically arranged in the four quadrants defined by the first cross-shaped path; the first sensor device coupled to the plane plate being designed to detect a tactile pressure on each pushbutton.

3. The infotelematic system according to claim 1, wherein the first sensor device comprises a piezoelectric film.

4. The infotelematic system according to claim 1, wherein the first sensor device comprises a capacitive film.

5. The infotelematic system according to claim 1, wherein reproduced on the display is a synoptic image that reproduces the shape of the control device indicating the functions associated to the control device itself.

6. The infotelematic system according to claim 1, wherein the control device comprises a haptic actuator, which is coupled to the slider for varying the force necessary to displace the slider itself along the circular closed path.

7. The infotelematic system according to claim 1, wherein the control device comprises:
   a plurality of pushbuttons, which are provided on the top surface of the plane plate, are made of touch-sensitive material, and are arranged within the first circular closed path; and
   a second sensor device coupled to the plane plate for detecting a tactile pressure on each pushbutton.

* * * * *